UNITED STATES PATENT OFFICE 2,500,093

TEXTILE PRINTING PASTE COMPRISING A DIAZOAMINO COMPOUND AND A SUBSTITUTED BENZOTHIAZOLE

Pierre Petitcolas, Paris, and Robert Frédéric Michel Sureau, Mont Saint-Aignan, France, assignors to Societe Anonyme de Matieres Colorantes et Produits Chimiques Francolor, Paris, France, a corporation of France No Drawing. Application August 29, 1945, Serial No. 613,426. In France December 1, 1942

Section 1, Public Law 690, August 8, 1946
Patent expires December 1, 1962

1 Claim. (Cl. 8—45)

We have found that the compounds of the general formulae:

and

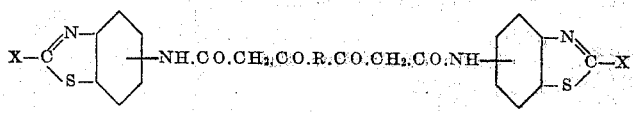

where R represents an alykl radical, while X represents an alkyl, alkoxy or alkylthio group and where the benzenic nuclei which are represented may contain other non-solubilizing groups, constitute new coupling agents having remarkable properties for the preparation of azo dyestuffs in natura or on a substratum.

The said compounds can be obtained, according to the invention, through condensation of the esters of the acylacetic acids with the aminobenzothiazols contining in position 2 an alkyl, alkoxy or alkylthio group while they may contain other substituents which are not capable of conferring the solubility in water. By alkyl group one means an alcohol radical and as examples of such groups one may quote —CH₃, —C₂H₅, —C₄H₉, —C₆H₁₁.

The amino-benzothiazols used as starting materials can be prepared, for instance, according to the following methods:

(1) For the amino-2-alkylbenzothiazols:

(a) Action of sulphur chloride upon aminoacylanilides;

(b) Nitration of 2-alkylbenzothiazols followed by reduction;

(c) Condensation with the alkaline disulphides of the compounds of the formula:

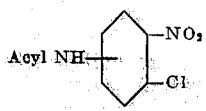

so as to obtain the disulphides of the formula:

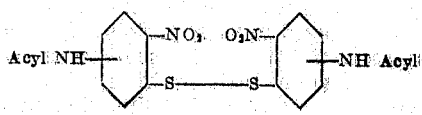

followed by reduction of the said disulphides to o.aminothiophenols of the formula:

oxydation of the said o.aminothiophenols to disulphides by means of peroxide of hydrogen or of a current of air so as to obtain the disulphides of the formula:

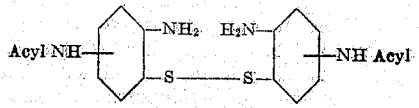

acylation of the latter and then reduction to the corresponding thiophenols of the formula:

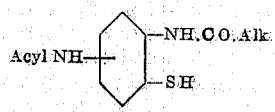

and finally cyclisation to benzothiazols of the formula:

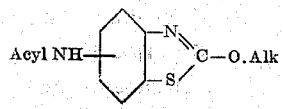

and saponification.

(2) For the amino-2-alkoxy-benzothiazols:

(a) Alkylation of nitro-2-oxybenzothiazol followed by reduction;

(b) Condensation of o.amino-thiophenols of the formula

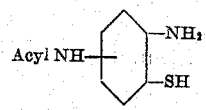

with phosgen or urea so as to form the benzothiazols of the formula:

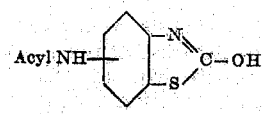

and finally alkylation of the said acylamino-2-oxybenzothiazols and saponification of the acyl group.

(3) For the amino-2-alkylthiobenzothiazols:
(a) Alkylation of the 2-mercapto-benzothiazols to alkylthiobenzothiazols of the formula:

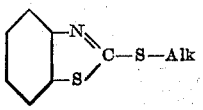

followed by nitration and reduction;
(b) Conversion of the disulphides of the formula:

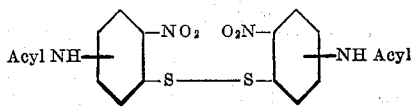

by means of carbon sulphide to 2-mercapto-benzothiazols of the formula:

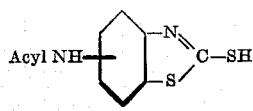

followed by alkylation and saponification of the acyl group.

The acylacetylamino-benzothiazols according to the invention possess, as already mentioned, properties which make them very interesting for the manufacture of azo dyestuffs in natura or on a substratum. By coupling with diazo or tetrazo compounds they yield, indeed, dyestuffs having excellent fastnesses. Some of them, such as the derivatives of the terephthaloylacetic acid have a remarkable affinity for cellulosic fibres and yield on the said fibres, through development with the most usual diazo derivatives, yellow shades having excellent fastnesses to light. Others, such as the derivatives of the acetylacetic acid are very soluble, in the cold, in caustic soda in a very diluted solution so that they are particularly suitable for printing when mixed with nitrosamines or diazo-amino derivatives. Shades very fast to light and of a very greenish yellow can thus be obtained.

When prepared in natura the dyestuffs according to the invention show properties differing according to the constitution of the diazo compounds from which they are obtained. The methods generally used in the art of dyestuffs allow to obtain, pigments, acid dyestuffs, direct or chromatable dyestuffs and the like.

The following are non-limitative examples:

Example 1

400 parts of 2-methylbenzothiazol (prepared according to the indications of chemical literature) are dissolved in 2,000 parts of monohydrated sulphuric acid energetically cooled (maximum temperature +5° C.). One pours little by little into the said solution, so that the temperature does not exceed 5° C., 590 parts of a sulphonitric mixture containing:

33% nitric acid,
66% sulphuric acid and
1% water

Half an hour after the end of the introduction one pours on ice. The nitrated derivative precipitates abundantly; one filters and washes with water. The yield is practically quantitative. The resulting 6-nitro-2-methylbenzothiazol yields after reduction with iron sharpened with acetic acid and rapid extraction of the iron sludge a base which, recrystallized from chlorobenzene, appears in the form of large brownish prisms having a melting point of 124° C.

Analysis:

| | Calculated for $C_8H_8N_2S$ | Found |
|---|---|---|
| Percent C | 58.54 | 58.61 |
| Percent H | 4.89 | 5.02 |
| Percent N | 17.07 | 17.03 |

The preparation of the acetacetylated derivative is effected by heating to ebullition a solution of 1 part of the above mentioned base in 4 parts of acetylacetic ether and by eliminating the alcohol which has formed during the reaction. After a few minutes every trace of diazotizable base has disappeared and through cooling the acetoacetylated derivative crystallizes. It is filtered and washed with alcohol. Re-crystallized from chlorobenzene it appears in the form of large prisms having a melting point of 133° C.

The benzoylacetylated derivative is prepared in a similar manner.

Example 2

One dissolves at the ebullition 500 parts of 1-methyl-2-acetylamino-4-chloro-5-nitrobenzene in 3,000 parts of ethyl alcohol. One pours little by little into the said solution while stirring well a solution of sodium disulphide prepared by starting from:

340 parts of $Na_2S, 9H_2O$
45 parts of sulphur and
160 parts of water

The disulphide precipitates. It is filtered, washed with alcohol and then with water in order to remove the mineral salts. The weight of the resulting product when dry corresponds to 450 parts. The product appears in the form of lemon yellow crystals.

450 parts of the preceding disulphide are reduced during 16 hours at 90° C. by means of 400 parts of iron filings, 50 parts of glacial acetic acid and 1500 parts of water. The reduction mass is neutralized with a solution of soda of 48° Bé. till an alkaline reaction on thiazol yellow. One filters and washes the iron sludge with water.

The substituted aminothiophenol is precipitated from its solution by means of acetic acid till acidity on litmus. One filters the crystals which are thoroughly centrifugalized. While still damp they are crushed with 500 parts of technical urea. The mass is heated to a soft ebullition (103/105° C.); ammonia escapes abundantly. The temperature is raised little by little up to about 115° C. The mass becomes viscous, homogeneous, with a greenish colour. It is taken again with alkaline hot water which nearly completely dissolves the thiazolone which has formed. The obtained solution is filtered and precipitated by concentrated hydrochloric acid till acidity on Congo red. The scarcely coloured crystals are filtered and washed. Their weight corresponds to 320 parts.

Re-crystallized from boiling nitrobenzene, the benzothiazolone (which is not very soluble) yields prisms having a melting point of 350° C. and which are not sublimable.

500 parts of 5-methyl-6-acetylaminobenzothiazolone are dissolved in 2,500 parts of water at 40° C. with about 230 parts of a solution of soda of 48° Bé. One pours little by little into the said solution about 300 parts of dimethyl-sulphate while ascertaining at the end of the operation that the solution has remained slightly alkaline and that it now contains only traces of benzothiazolone. One heats during 2 hours at 90–95° C. After cooling one filters the white crystalline mass which is then washed with water; its weight when dry corresponds to 550 parts.

Re-crystallized from acetic acid, the methoxylated derivative yields small white prisms having a melting point at 266° C. (non corrected), and which are sublimable.

The preceding derivative is brought to ebullition during 4 hours in a mixture of 1,000 parts of water and 1,000 parts by volume of concentrated hydrochloric acid. The saponification is ended when a diluted sample is entirely soluble. One then dilutes the whole with about its volume of hot water in order to dissolve everything and one neutralizes with caustic soda. The base precipitates. It is filtered and washed. Re-crystallized from chlorobenzene it yields whitish prisms having a melting point of 177° C.

Analysis:

|  | Calculated for $C_9H_{10}ON_2S$ | Found |
| --- | --- | --- |
| Per cent C | 55.6 | 55.9 |
| Per cent H | 5.15 | 5.40 |
| Per cent N | 14.43 | 14.33 |

The ethoxylated derivative is prepared in an identical manner. One obtains from the preceding benzothiazolone:

(1) The 6-acetylamino-5-methyl-2-ethoxy-benzothiazol which, recrystallized from acetic acid, yields microscopic white crystals (M. P.=182° C.);

(2) The 6-amino-5-methyl-2-ethoxy-benzothiazol which, re-crystallized from chlorobenzene, yields bright slate-grey crystals (M. P.=164° C.).

Analysis:

|  | Calculated for $C_{10}H_{12}ON_2S$ | Found |
| --- | --- | --- |
| Per cent N | 13.46 | 13.38 |

The 6-acetoacetylamino-5-methyl-2-methoxy-benzothiazol can be obtained easily by heating to ebullition 1 part of the corresponding base in 5 to 6 parts of acetylacetic ether while distilling the alcohol which has formed. Through cooling, the aceto-acetylated derivative crystallizes in large white prisms. Re-crystallized from chlorobenzene it yields white crystals melting at 190° C. and solidifying immediately to melt again at 195° C.

The 6-acetoacetylamino-5-methyl-2-ethoxy-benzothiazol is prepared in the same manner. Re-crystallized from chlorobenzene it yields white crystals (M. P.=168° C.).

The terephthaloyl-bis-(6-acetylamino-5-methyl-2-methoxybenzothiazol) of the formula:

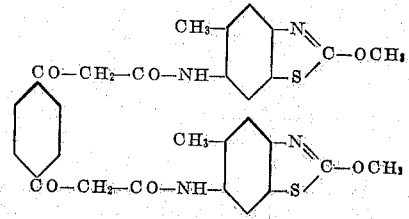

is obtained by dissolving 35 parts of the base and 45 parts of terephthaloylacetic ether in 400 parts of chlorobenzene. The whole is brought to ebullition thus distilling chlorobenzene which carries with it the alcohol which has formed during the reaction. After about ½ hour, the acylacetylated derivative has precipitated and every trace of diazotizable base has disappeared. One allows to cool, filters and washes the crystals with alcohol; they are greenish white, nearly insoluble in all the organic solvents and have a melting point of 320–325° C.

One obtains in the same manner the ethoxylated derivative corresponding to the formula:

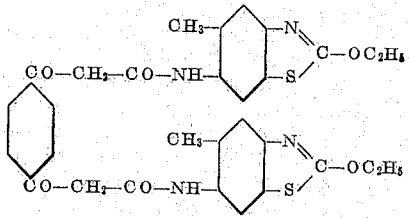

It appears in the form of scarcely coloured crystals having a melting point of 282–285° C.

*Example 3*

For the preparation of the 5-chloro-6-amino-2-methoxybenzothiazol, of its acylacetylated derivatives and of their ethoxylated homologues, the subsequent operations are the same as in Example 2. The successively obtained products are the following:

(a) The 5-chloro-6-acetylamino-2-oxybenzothiazol (5-chloro-6-acetylamino-benzothiazolone), a compound which is not very soluble in most organic solvents. Re-crystallized from boiling nitrobenzene it yields sublimable greenish needles (M. P.=315–320° C.).

(b) The 5-chloro-6-acetylamino-2-methoxybenzothiazol which, re-crystallized from acetic acid, yields small greenish white prisms (M. P.=262° C.);

(b') The 5-chloro-6-acetylamino-2-ethoxybenzothiazol which, re-crystallized from acetic acid, yields clear greenish white crystals (M. P.=207° C.);

(c) The 5-chloro-6-amino-2-methoxybenzothiazol which, re-crystallized from chlorobenzene, yields white crystals (M. P.=170° C.);

Analysis:

|  | Calculated for $C_8H_7ON_2SCl$ | Found |
| --- | --- | --- |
| Per cent C | 44.74 | 44.33 |
| Per cent H | 3.26 | 3.52 |
| Per cent N |  |  |

(c') The 5-chlor-6-amino-2-ethoxy-benzothiazol, re-crystallizing from chlorobenzene in the form or bright light beige prisms (M. P.=153–154° C.);

| Titration of nitrogen | Calculated | Found |
| --- | --- | --- |
| Per cent N | 12.25 | 12.30 |

(d) The 5-chloro-6-acetoacetylamino-2-methoxyzenzothiazol, re-crystallizing from chlorobenzene in the form of white prisms (M.P.=169° C.);

(d') The 5-chloro-6-acetoacetylamino-2-ethoxy-benzothiazol, re-crystallizing from chlorobenzene in the form of white crystals (M.P.=146° C.).

Example 4

For the preparation of the 5-methoxy-6-amino-2-methoxybenzothiazol, of its acylacetylated derivatives and of their homologues, the subsequent operations are the same as in Example 2. The starting product is the 2-2'-dinitro-4-4'-dimethoxy-5-5'-diacetylamino-1-1'-diphenyl-disulphide of the formula:

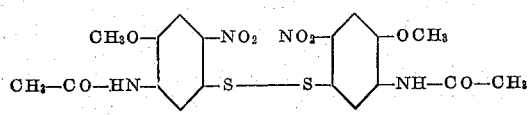

and the successively obtained compounds are:

(a) The 5-methoxy-6-acetylamino-2-oxybenzothiazol (5-methoxy-6-acetylamino-benzothiazolone) which, re-crystallized from nitrobenzene, yields sublimable greyish needles having a melting point of 320–325° C. (The said derivative has also been obtained by causing a current or phosgen to bubble through the carbonatic alkaline solution of 2-amino-4-methoxy-5-acetylamino-1-thiophenol);

(b) The 5-methoxy-6-acetylamino-2-methoxy-benzothiazol which, re-crystallized from acetic acid, appears in the form of fine greyish white crystals (M.P.=225° C.);

(b') The 5-methoxy-6-acetylamino-2-ethoxybenzothiazol, re-crystallizing from acetic acid in the form of snow-white crystals (M.P.=172° C.);

(c) The 5-methoxy-6-amino-2-methoxybenzothiazol, re-crystallizing from chlorobenzene in the form of light beige crystals (M. P.=165–166° C.);

Analysis:

|  | Calculated for $C_9H_{10}O_2N_2S$ | Found |
| --- | --- | --- |
| Percent C | 51.43 | 51.69 |
| Percent H | 4.76 | 5.07 |
| Percent N | 13.33 | 13.35 |

(c') The 5-methoxy-6-amino-2-ethoxybenzothiazol, re-crystallizing from chlorobenzene in the form of light grey crystals (M.P.=115° C.);

Analysis:

|  | Calculated for $C_{10}H_{12}O_2N_2S$ | Found |
| --- | --- | --- |
| Percent C | 53.57 | 53.12 |
| Percent H | 5.36 | 5.51 |
| Percent N | 12.50 | 12.58 |

(d) The 5-methoxy-6-acetoacetylamino-2-methoxy-benzothiazol, re-crystallizing from chlorobenzene in the form of very light beige crystals (M. P.=162° C.);

Analysis:

|  | Calculated for $C_{12}H_{14}N_2O_4S$ | Found |
| --- | --- | --- |
| Percent N | 9.52 | 9.48 |

(d') The 5-methoxy-6-acetoacetylamino-2-ethoxy-benzothiazol, re-crystallizing from chlorobenzene in the form of light beige crystals (M. P.=145° C.);

|  | Calculated | Found |
| --- | --- | --- |
| Titration of nitrogen | 9.09 | 9.05 |

(e) The terephthaloyl acetylated derivatives corresponding to the formula:

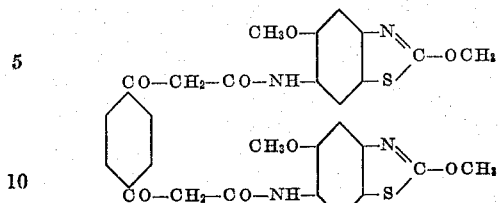

and

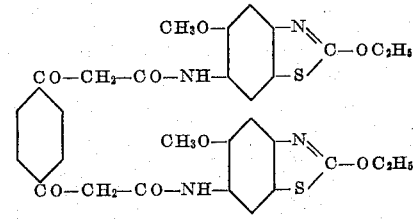

appearing in the form of greenish yellow crystals the melting points of which are 300–305° C. and 315° C. respectively are obtained in the same manner as the phthaloyl acetylated derivative of the 6-amino-5-methyl-2-methoxy-benzothiazol described in Example 2.

Example 5

250 parts of 2.2'-diamino-4.4'-dimethyl-5,5'-diacetylamino - 1.1' - diphenyldisulphide are dissolved at ebullition point in 2,000 parts of acetic acid and acetylated through adding little by little 250 parts of acetic anhydride. Once the acetylation ended, one pours on ice and filters the acetylated derivative which is taken again, as a paste, by:

800 parts of ethyl alcohol,
800 parts of concentrated hydrochloric acid and
300 parts of stannous chloride.

After an ebullition of 3 hours the whole is dissolved. One pours the mass on 1,500 parts of water to which 150 parts of tartric acid have been added and neutralizes with caustic soda till a distinct alkalinity on thiazol yellow paper. The precipitated base, which is constituted by the 6-amino - 2 - 5 - dimethyl-benzothiazol is filtered and dried. Crystallized in chlorobenzene it yields 150 parts of large light green prisms having a melting point of 168° C.

Analysis:

|  | Calculated for $C_9H_{10}N_2S$ | Found |
| --- | --- | --- |
| Percent C | 60.67 | 60.58 |
| Percent H | 5.62 | 5.76 |
| Percent N | 15.73 | 15.76 |

The acetoacetylated derivative is prepared as in the preceding examples. Re-crystallized from chlorobenzene it yields fine greyish white needles (M. P.=162° C.).

The terephthaloylacetylated derivative yields small scarcely coloured prisms which are nearly insoluble in most organic solvents and melt at 296° C. while decomposing. Its preparation is identical with that of the corresponding derivative of the 6-amino-5-methyl-2-methoxy-benzothiazol (see Example 2).

The preparation of the 6-amino-5-methoxy-2-methyl-benzothiazol and of its acylacetylated derivatives is absolutely similar. The base, recrystallized from chlorobenzene, yields fine light brown crystals (M. P.=106° C.).

Analysis:

|  | Calculated for $C_9H_{10}ON_2S$ | Found |
| --- | --- | --- |
| Per cent C | 55.68 | 56.08 |
| Per cent H | 5.15 | 5.41 |
| Per cent N | 14.43 | 14.40 |

The acetoacetylated derivative, re-crystallized from chlorobenzene, yields prismatic slightly greenish crystals melting at 300° C. while decomposing.

Example 6

600 parts of 2.2'-diamino-4.4'-dichloro-5.5'-diacetylamino-1.1'-diphenyldisulphide are dissolved in 3,000 parts of acetic acid and one acetylizes with 600 parts of acetic anhydride which are introduced little by little so that the mass is brought to ebullition.

The whole is diluted with water, filtered and the acetylated derivative is washed. The well centrifugalized paste is taken again by 1.000 parts of alcohol, 400 parts of stannous chloride and 800 parts by volume of concentrated hydrochloric acid at ebullition point during 3 hours. After cooling, one filters the precipitated hydro-chlorate which is then decomposed at the ebullition by a diluted solution of caustic soda in presence of tartric acid.

The base constituted by the 6-amino-5-chloro-2-methylbenzothiazol, re-crystallized from chlorobenzene, yields greenish white prisms melting at 155–156° C. while sublimating.

Analysis:

|  | Calculated for $C_8H_7N_2SCl$ | Found |
| --- | --- | --- |
| Per cent C | 48.32 | 47.96 |
| Per cent H | 3.52 | 3.65 |
| Per cent N | 14.10 | 14.08 |

The acetoacetylated derivative crystallizes in chlorobenzene in the form of large slightly greenish prisms (M. P.=167° C.).

The terephthaloylacetylated derivative appears in the form of light green prisms melting at 292° C. while decomposing.

Example 7

For the preparation of the 6-amino-2-methoxy-benzothiazol and of its acetoacetylated derivative, one reduces with iron and acetic acid the corresponding nitrated derivative already prepared by R. Hunter and E. Parker (C. 1936.1.2940). The iron sludge, extracted with boiling alcohol, yields a base which crystallizes in chlorobenzene in the form of colourless flakes having a melting point of 184° C.

Analysis:

|  | Calculated for $C_8H_8ON_2S$ | Found |
| --- | --- | --- |
| Per cent C | 53.33 | 53.77 |
| Per cent H | 4.44 | 4.75 |
| Per cent N | 15.55 | 15.60 |

The acetoacetylated derivative can be prepared as in the preceding examples.

Example 8

The preparation of the 6-nitro-2-ethoxy-benzothiazol can be effected like that described by R. Hunter and E. Parker for the 6-nitro-2-methoxy-benzothiazol through substituting the dimethyl sulphate by the diethyl sulphate. Through re-crystallization from alcohol one obtains flakes (M. P.=203° C.).

Through reduction a base is isolated which, re-crystallized from chlorobenzene, appears in the form of colourless crystals having a melting point of 134° C.

Analysis:

|  | Calculated for $C_9H_{10}ON_2S$ | Found |
| --- | --- | --- |
| Per cent C | 55.67 | 55.18 |
| Per cent H | 5.15 | 5.27 |
| Per cent N | 14.43 | 14.42 |

The acetoacetylated derivative has a melting point of 128° C.

Example 9

250 parts of 2-mercaptobenzothiazol are dissolved in 1,000 parts of water with the quantity of soda which is necessary for the dissolution. Into the well intermixed solution 200 parts of dimethyl sulphate are poured between 40 and 60° C.

One takes care that the solution remains always alkaline and, if necessary, one adds, from time to time, a small quantity of soda in a diluted solution. One further heats during 2 to 3 hours at 60–70° C. A decanted and acidified test should no longer precipitate part of the starting product (otherwise one would still add a small quantity of dimethyl sulphate). One allows to settle during one night. On the next day one decants the crystalline cake deposited on the bottom of the apparatus. One filters and centrifugalizes thoroughly. One thus obtains 235 parts of a nearly dry product constituted by the 2-methylthiobenzothiazol having a melting point of 50° C. (according to literature [C.1927.1.281] M. P.=52° C.), which is nitrated directly.

For this purpose, 235 parts of raw 2-methylthiobenzothiazol are pasted in 1,000 parts by volume of monohydrated sulphuric acid without exceeding 25° C. One nitrates through addition of 260 parts by weight of a sulphonitric mixture with 33% of nitric acid between 10 and 15° C. One mixes during 2 hours at this temperature, pours on ice, filters and washes thoroughly.

The raw product constituted by the 6-nitro-2-methylthio-benzothiazol melts at 126–127° C. Re-crystallized from acetic acid it appears in the form of yellowish white crystals having a melting point of 132–134° C. (according to C.1937.1.3146, M. P.=128° C.).

100 parts of the resulting nitrated derivative are added to a mixture of:

150 parts of iron powder,
20 parts of hydrochloric acid and
1500 parts of water.

After heating during 4 to 5 hours one alkalinizes through addition of sodium carbonate, filters, centrifugalizes thoroughly and extracts the iron sludge with alcohol. The filtered alcoholic solution yields through addition of water the base constituted by the 6-amino-2-methylthio-benzothiazol in the form of white needles (M. P.=111–112° C.).

One brings the base to the boil in an excess of acetylacetic ether. The acetylacetylated derivative crystallizes through cooling in the form of white needles (M. P.=121–122° C.).

If the dimethylsulphate is substituted in the preceding operation by diethyl sulphate in an equivalent quantity, one obtains 2-ethylthiobenzothiazol which, re-crystallized from methyl alcohol at 80°, yields beautiful white needles (M. P.=27° C.) and, later, 6-nitro-2-ethylthiobenzothiazol (M. P.=106–107° C.), 6-amino-2-ethylthiobenzothiazol (M. P.=76–77° C.) and finally the 6-acetoacetyl-amino-2-ethylthiobenzothiazol (M. P.=129–130° C.).

*Example 10*

400 parts of 2.5-dichloro-4-nitroacetanilide are mixed with a hot solution of sodium disulphide prepared from:

| | Parts |
|---|---|
| Na₂S, 9H₂O | 1,000 |
| Sulphur | 375 |
| Water | 1,000 |

The temperature rises to about 85° C. One pours immediately 250 parts of carbon sulphide drop by drop, so as to maintain the backflow. The mass is strongly mixed. The temperature rises further. One mixes during one and a half hour at 80° C. The carbon sulphide is totally absorbed. One further adds 20 parts of CS₂, and heats during 2 hours with back-flow. This time the CS₂ is no longer absorbed. The solution which was first brown has become yellow. One acidifies with hydrochloric acid, filters, takes the cake again with 4,000 parts of cold water and caustic soda until the reaction is distinctly alkaline to thiazol. The mercaptan dissolves, one filters the insoluble sulphur and precipitates the 5-chloro-6-acetylamino - 2 - mercapto-benzothiazol from the solution through acidification with hydrochloric acid. A compact mass forms. One filters, washes and centrifugalizes (M. P.>300° C.).

Half of the resulting product is pasted when still damp in 750 parts of tepid water. One adds caustic soda till a slight alkalinity is reached and mixes during one hour. One filters the slight remaining insoluble residue. One pours 105 parts of dimethyl sulphate drop by drop during one hour and at 40° C. while mixing. One takes care that the medium remains alkaline. The methyl derivative soon begins to precipitate. One then heats to 60–75° C. during 2 hours. One allows to cool, filters and washes with water. The raw product has a melting point of 173–180° C.; re-crystallized from ethyl alcohol, its melting point is 203–204° C.

One then heats during two hours at 100–105° C. the following mixture:

| | |
|---|---|
| The formerly obtained acetylated derivative parts by weight | 100 |
| Concentrated sulphuric acid do | 280 |
| Water parts by volume | 75 |

One pours into 1,000 parts of cold water and heats to 80° C. The sulphate which had crystallized dissolves again while the solution which was first bluish loses its colour and an impurity flocculates. One filters in the hot and precipitates the base through neutralization with ammonia.

The raw product constituted by the 5-chloro-6-amino-2-methylthiobenzothiazol crystallizes in the form of greenish white crystals (M. P.=135–136° C.). Re-crystallized from methyl alcohol and then from ethyl alcohol it appears in the form of greyish white crystals (M. P.=139–140° C.).

The 5-chloro-6-acetylamino-2-methylthiobenzothiazol is prepared through a short ebullition of the purified base in an excess of acetylacetic ether. On cooling, the product crystallizes in white crystals which are filtered and washed with alcohol (M. P.=133–134° C.).

One prepares in the same manner the 5-chloro-6-acetylamino-2-ethylthiobenzothiazol (M. P.=135° C., white needles), the 5-chloro-6-amino-2-ethyl-thiobenzothiazol (M. P.=101° C., white crystals) and the 5-chloro-6-acetoacetylamino-2-ethylthiobenzothiazol (M. P.=110° C., white crystals).

*Example 11*

522 parts of 2-methoxy-4-nitro-chloro-acetanilide are mixed with a hot solution of sodium disulphide prepared from:

| | Parts |
|---|---|
| SNa₂, 9H₂O | 1,250 |
| Sulphur | 500 |
| Water | 1,250 |

While mixing, 325 parts of carbon sulphide are added drop by drop so as to maintain a slight back-flow. One brings progressively up to 90° C. during 14 to 16 hours. The reaction can be considered as ended when a test on filter paper deposits an abundant yellow precipitate surrounded by an intensive bright yellow and not brownish ring.

One allows to rest during one night and then filters. The precipitate is taken again 3,000 parts of cold water and soda till an alkaline reaction on thiazol yellow is reached. One mixes during one hour, filters and precipitates in the solution by means of hydrochloric acid the 5-methoxy 6-acetylamino-2-mercaptobenzothiazol in the form of a compact paste which is filtered off, washed and centrifugalized.

While still damp the preceding product is taken again with 3,000 parts of cold water and the soda which is necessary for rendering the solution slightly alkaline. One filters a small quantity of sulphur and pours, while mixing, into the filtrate, during one hour and at a temperature of 25–40° C., 250 parts of dimethyl sulphate. The methyl derivative crystallizes. One makes sure that the medium remains alkaline and heats during 2 hours at 60° C. in order to destroy the excess of dimethyl sulphate. One filters and washes abundantly.

Re-crystallized from methyl alcohol the obtained product appears in the form of white crystals (M. P.=146–147° C.).

For the preparation of 6-amino-5-methoxy-2-methyl-thiobenzothiazol one saponifies the preceding product during 3 hours at 100° C. in 10 times its weight of sulphuric acid of 60%, brings to ebullition during a few moments with carboraffine and filters. One pours on ice and neutralizes with ammonia, filters and washes thoroughly. Re-crystallized from methyl alcohol the base appears in the form of yellowish white crystals (M. P.=119–120° C.).

The 6-acetoacetylamino-5-methoxy-2-methyl-thiobenzothiazol is obtained through a short ebullition of the purified base in a large excess of acetylacetic ether. One filters, washes with alcohol. Re-crystallized from alcohol, the said product yields white crystals (M. P.=91° C.).

One obtains in a similar manner the 5-methoxy-6-acetylamino-2-ethylthiobenzothiazol (re-crystallized from diluted methyl alcohol at 50%, (M. P.=115° C.), the 5-methoxy-6-amino-2-ethylthiobenzothiazol (M. P.=89–90° C.), and the 5-methoxy-6-acetoacetylamino- 2 -ethylthiobenzothiazol (white crystals M. P.=73° C.).

Example 12

One prepares in the same way as in Example 11 the 5 - methyl - 6 - acetylamino -2 - thiobenzothiazol, the 5-methyl-6-acetylamino-2-methylthiobenzothiazol (M. P.=215–217° C.), the 6-amino - 5 - methyl - 2 - methylthiobenzothiazol (M. P.=133–134° C.), the 6-acetoacetylamino-5-methyl - 2 - methylthiobenzothiazol (M. P.= 151–152° C.), the 6-acetylamino - 5 - methyl - 2 -ethylthiobenzothiazol (M. P.=147–148° C.), the 6 - amino - 5 - methyl - 2 - ethylthiobenzothiazol (M. P.=86–87° C.) and the 6-acetoacetylamino-5-methyl-2-ethylthiobenzothiazol (M. P.=114–115° C.).

Example 13

One heats to ebullition in a bulb provided with a descending cooler so as to expel the alcohol which has formed and some chlorobenzene the following mixture:

| | Parts |
|---|---|
| Dry chlorobenzene | 250 |
| 6-amino-2-methylthiobenzothiazol | 20 |
| Terephthaloylacetic ether (terephthaloylacetate of ethyl) | 20 |

After a few minutes one finds that the condensation product begins to crystallize. After an ebullition of about half an hour one ascertains that no free base remains (diazotizing test). One allows to cool, filters, centrifugalizes, washes with alcohol and dries in the drying-room. The resulting product has a (noncorrected) melting point of 239° C.

Through application of the same method one prepares in the same manner the terephthaloyl-bis-(6-amino-2-ethylthiobenzothiazol) (M. P.= 265° C.), the terephthaloyl - bis - (5 - chloro - 6 - amino-2-ethylthiobenzothiazol) (M. P.=259–260° C. with decomposition), the terephthaloyl-bis-(5-methoxy- 6 -amino- 2 -ethylthiobenzothiazol) (M. P.=260° C.); the terephthaloyl - bis - (5' - methoxy- 6 -amino - 2 - methylthiobenzothiazol) (M. P.=254° C.), the terephthaloyl-bis-(5-methyl-6-amino-2-ethylthiobenzothiazol) (M. P.=268° C. with decomposition), and the terephthaloyl-bis-(5-methyl- 6 -amino- 2 -methylthiobenzothiazol) (M. P. =283° C. with decomposition).

Example 14

0.5 part of the terephthaloyl derivative of the 2-5-dimethoxy-6-aminobenzothiazol prepared as described in Example 4 are pasted in 2 parts of methylated ethyl alcohol and 0.25 part in volume of caustic soda of 48° Bé. 2 parts of boiling water are added. The whole dissolves. One pours in a thin jet while stirring into 400 parts of water at 45–50° C. containing a colloidal protector and 2 parts by volume of soda of 48° Bé. One handles during 15 minutes in the said grounding bath 20 parts of bleached cotton and then one ends the exhausting with 20 parts of anhydrous sodium sulphate. One further handles during 15 minutes at 45° C. and centrifugalizes thoroughly. The bath then contains only very small quantities of coupling means. The well centrifugalized skein is developed in a diazo bath containing 3 grams of diazonium chlorozincate of the dichloroanilin 1.2.5. (amino-1) and 5 grams of alumina sulphate per litre. After half an hour one centrifugalizes, washes and treats at ebullition point during half an hour in an alkaline bath containing:

0.4 gram of sodium hydrosulphite and
0.5 gram of soda of 35° Bé.

per litre. One thus obtains a bright yellow having excellent fastness properties.

Under the same conditions, through substituting the terephthaloylacetyl derivative of the 6-amino-2.5-dimethoxybenzothiazol by the terephthaloylacetyl derivatives of the 6-amino-5-methoxy-2-methylthiobenzothiazol one obtains a very bright true yellow having excellent fastnesses.

Example 15

30 parts of 6-acetoacetylamino-2.5-dimethoxybenzothiazol prepared according to Example 4 are intimately mixed with 30 parts of the diazoamino derivative obtained with the diazo of the 4-chloro-0-toluidin and the sarcosin (of 80%) and 15 parts of sodium sulphate.

40 parts of said mixture are pasted in 50 parts of Turkish red oil,
30 parts of caustic soda of 38° Bé. and
150 parts of tepid water.

The whole is added while stirring to 500 parts of a neutral starch-gum tragacanth thickening agent and brought to 1,000 parts with 230 parts of water or thickening agent.

After printing and drying one steams during 5 minutes in an acid vapour, rinses thoroughly, soaps at ebullition point, rinses and dries. One obtains a yellow of very good fastnesses.

Example 16

30 parts of 5-chloro-6-acetoacetylamino-2-methoxy-benzothiazole prepared according to Example 3 are intimately mixed with 31 parts of the diazoamino derivative obtained from the diazo of the p.chloro-o.aminoanisol and of the sarcosin (of 80%) and 14 parts of sodium sulphate.

One pastes, prints, steams as in the preceding example. One obtains a very greenish yellow of very good fastnesses.

By using the different derivatives of the general formula:

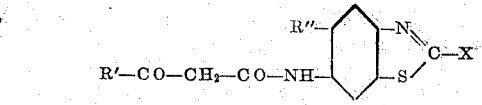

where

X=alkyl or alkoxy,
R'=alkyl or aryl and
R"=H, alkyl, alkoxy, halogen, mixed with the diazoamino derivatives of various solid bases, more particularly:

4 Cl.o.toluidin ⟶ sarcosin
5 Cl.o.toluidin ⟶ sarcosin
p.Cl.o.aminoanisol ⟶ sarcosin
5 nitro o. toluidin ⟶ oxyethylanthranilic 4.sulpho acid

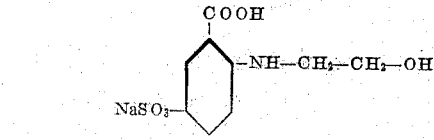

or still with the nitrosamines (nitrosamines of dichloroanilin, of m.chloroanilin, of o.nitrotoluidin, of p.Cl.o.aminoanisol and the like) one obtains a whole scale of yellows from very greenish yellow to orange yellow.

*Example 17*

10 parts of 6-acetoacetylamino-2-methylthiobenzothiazol prepared according to Example 9 are intimately mixed with 11.7 parts of the diazoamino derivative obtained through condensation of the diazo of the p.chloro.o.aminoanisol with sarcosin (of 80%) and 3.3 parts of anhydrous sodium sulphate.

20 parts of this mixture are pasted in:

25 parts of Turkish red oil,
15 parts of caustic soda of 38° Bé, and
75 parts of tepid water The resulting solution is added while stirring to 250 parts of a neutral starch-gum tragacanth thickening agent and is brought to 500 parts through addition of water or of thickening agent.

After printing and drying one steams during 5 minutes in an acid vapour. One rinses, soaps at ebullition point, rinses and dries. One obtains a true yellow of very good fastnesses.

*Example 18*

10 parts of 5-methyl-6-acetoacetylamino-2-methylthiobenzothiazol prepared as described in Example 12 are intimately mixed with 9 parts of the diazoamino derivative obtained through condensation of the diazo of the 4-chloro-o.toluidin with sarcosin (of 80%) and 6 parts of anhydrous sodium sulphate.

One prints, dries, steams, washes as in Example 14. One obtains a greenish yellow of very good fastnesses.

By using the various derivatives of the general formula:

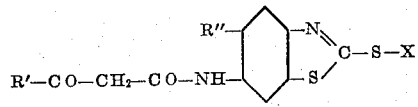

where
X=alkyl
R'=alkyl or aryl,
R"=H, alkyl, aralkyl, halogen, mixed with the diazoamino derivatives of various solid bases, such as:

4 Cl.o.toluidin ⟶ sarcosin
5.Cl.o.toluidin ⟶ sarcosin
p.Cl.o.toluidin ⟶ sarcosin
5-nitro-o.toluidin ⟶ hydroxyethylanthranilic 4-sulpho acid

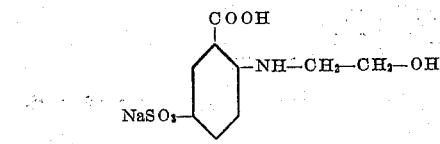

or still with nitrosamines (as, for instance, those of the dichloranilin, m.chloranilin, o.nitrotoluidin, p.chloro o.aminoanisol and the like) one obtains a whole scale from the greenish yellow to the orange showing a whole series of very good fastnesses.

*Example 19*

0.5 part of terephthaloyl-bis-(5-methoxy-6-amino-2-ethylthiobenzothiazol) prepared according to Example 13 are pasted in 2 parts of ethyl alcohol. 0.25 part by volume of a solution of soda of 48° Bé and 1 to 2 parts of boiling water are added. The whole dissolves. One pours into the following bath:

Sulphoricinate _____ 5 parts by volume
NaOH 48° B _____ 2 parts by volume
Water Q. S _____ 400 parts at 40/45° C.

20 parts of cotton are grounded in the said bath and one exhausts through addition, after 20 minutes, of 16 parts of crystallized sodium sulphate in small fractions while stirring well. After half an hour one centrifugalizes the cotton and develops according to the usual technics in a diazo bath, for instance in diazo of o.nitranilin. In this case one obtains after boiling in an alkaline bath containing 2%o of hydrosulphite a yellowish orange endowed with excellent properties of fastness.

By using the same receipt with the terephthaloyl-bis (6 acetylamino-2-methylthiobenzothiazol) and developing the cotton threads after grounding in a bath of diazo of 2.5-di-chloraniline, one obtains after boiling in an alkaline hydrosulphite bath as in Example 14 a bright true yellow of an excellent fastness.

*Example 20*

152 parts of m.nitro p.toluidin are diazotized and the obtained diazo solution is poured into a coupling bath containing 264 parts of 6-acetylamino-2-methoxy-benzothiazol. One obtains a yellow pigment insoluble in water and particularly suitable for the coloration of papers and plastic materials.

*Example 21*

267 parts of 2-amino-3-naphthoic sulphonic acid obtained through sulphonation of the 2-amino-3-naphthoic acid by means of sulphuric monohydrate are diazotized.

One prepares, on the other hand, a coupling bath containing 278 parts of 6-acetoacetylamino-5-methyl-2-methoxy-benzothiazol and buffered by means of sodium acetate and pours the solution of coupling agent into the pasting of the diazo derivative.

When the formation of the dyestuff is ended one precipitates the latter entirely through acidification. Isolated, dried and converted into a salt of soda, it appears in the form of a yellow powder and dyes wool in yellow shades; the obtained dyeings may be passed through a bichromate bath.

*Example 22*

590 parts of 2-nitro-4-acetylamino-chlorobenzene are pasted in 1,000 parts of ethyl alcohol and the following solution is introduced during a quarter of an hour while strongly mixing:

Parts
$S_2Na_2$, $9H_2O$ _____ 384
S _____ 51
Water _____ 100

One heats with back flow during 4 to 5 hours and allows it to rest during one night.

One filters, washes first with a little quantity of alcohol and then abundantly with water, dries at 100/105° C. and obtains brown crystals the melting point of which is higher than 300° C. Collected weight: 367 parts of 2-2'-dinitro-4-4'-diacetylamino-diphenyldisulphide.

150 parts of the preceding disulphide are introduced into a reducing mixture previously brought to ebullition during a few minutes and containing:

| | Parts |
|---|---|
| Iron powder | 400 |
| Acetic acid | 25 |
| Water | 1000 |

One brings to 90/95° C. during 14 hours, allows to cool, alkalinizes with 35 parts of soda of 48° Bé., washes first with 150 parts of water to which 5 parts of soda have been added, then with water. The solution of thiophenate is rather oxidizable and the following operation should be performed without delay.

The obtained solution of 4-acetylamino-2-aminothiophenol is acidified with acetic acid till formation of a slight turbidity. One adds 75 parts of acetic anhydride and allows it to rest during a few hours.

2-4-diacetylaminothiophenol precipitates and is filtered, dried summarily and treated to ebullition during 2 to 3 hours with the following solution:

| | Parts |
|---|---|
| Concentrated hydrochloric acid | 150 |
| Water | 300 |

One neutralizes with ammonia. The obtained 5-amino-2-methylbenzothiazol crystallizes (M. P. =100–101° C.).

The acetoacetylation is effected through ebullition in an excess of acetylacetic ether. The following hot solution:

| | Parts |
|---|---|
| 5-amino-2-methylbenzothiazol | 80 |
| Chlorobenzene | 600 | is poured into:

| | Parts |
|---|---|
| Boiling chlorobenzene | 500 |
| Acetylacetic ether | 130 |

One heats during two hours after introduction and expels in the whole 800 parts of chlorobenzene. On cooling, the largest part of the acetoacetyl derivative crystallizes in the form of white crystals (M. P.=130° C.).

*Example 23*

The solution of 4-acetylamino-2-amino-thiophenate of soda obtained in Example 22 is acidified with 40 parts of acetic acid. The thiophenol crystallizes immediately. It is filtered and centrifugalized thoroughly and the still damp product is introduced into 100 parts of urea molten at 125/130° C. One heats during one and a half hour at this temperature. A large quantity of ammonia escapes and the mass thickens little by little. One allows to cool at 100° C. and adds 300 parts of boiling water and caustic soda until a distinct alkalinity is reached.

After cooling one filters a slight insoluble residue. The product is precipitated through acidification with hydrochloric acid, filtered, washed and dried in the drying-room. It is a greyish white powder the melting point of which is higher than 300° C. and which consists of 5-acetylamino-2-hydroxy-benzothiazol. (The same product is obtained by causing a current of phosgen to pass in the cold through the thiophenate solution. The product is then isolated in the same manner.)

43 parts of 5-acetylamino-2-hydroxybenzothiazol are dissolved in 400 parts of water and the quantity of soda which is necessary for obtaining a reaction which is distinctly alkaline to thiazol paper. 35 parts of dimethyl sulphate are poured during 10 minutes into this solution while mixing and at 35/40° C.

The methyl derivative is not long in precipitating. After one hour one heats during a few minutes to 80/90° C. in order to destroy the excess of dimethyl sulphate. One takes care that the medium remains alkaline during the whole operation. One adds a small quantity of soda, if necessary, filters, washes and dries (M. P. raw = 214–215° C.).

The acetylated derivative is saponified through heating with back flow during 3 hours in 4 times its weight of hydrochloric acid 1/1. One neutralizes with ammonia in order to precipitate the base, filters, washes with water. One obtains the 5-amino-2-methoxy-benzothiazol having a raw melting point of 171–172° C.

For the preparation of the acetoacetyl derivative one proceeds in the above described manner and obtains a product with a melting point of 160–161° C.

*Example 24*

214 parts of 2-nitro-4-acetyl-aminochlorobenzene are introduced into an apparatus provided with a stirring device, a cooler and a thermometer.

The following hot solution is poured rapidly into the same:

| | Parts |
|---|---|
| Crystallized sodium sulphide | 600 |
| Sulphur | 250 |
| Water | 700 |

The temperature is 70° C. One pours 145 parts of carbon sulphide drop by drop during 2 hours while maintaining a slight back flow of $CS_2$. One maintains during 6 hours at 80–90° C., allows to settle during the night and filters; one washes with salt water and then with slightly hydrochloric water. The precipitate is repasted in 1,000 parts of water and rendered alkaline with caustic soda. One filters and precipitates the 5-acetylamino-2-mercapto-benzothiazol through addition of hydrochloric acid. One filters, washes and dries. One obtains 210 parts of 5-acetyl-amino-2-mercaptobenzothiazol having a melting point of over 300° C.

The preceding product is re-dissolved into 1,000 parts of cold water and the quantity of soda which is necessary for obtaining a distinct alkalinity on thiazol paper. One mixes and adds drop by drop 126 parts of dimethylsulphate (temperature 30–35° C.). After 2 hours one filters the product which has crystallized. One washes with water and obtains 168 parts of 5-acetylamino-2-methylthiobenzothiazol having a melting point of 70–71° C.

The preceding product is saponified with back flow during 2 hours in the following solution:

| | Parts |
|---|---|
| Water | 400 |
| Concentrated hydrochloric acid | 200 |

One dilutes with 1,500 parts of water to which ice has been added and precipitates the base with soda. One filters, washes with water and dries. One obtains the 5-amino-2-methylmercaptobenzothiazol with a melting point of 111° C.

For the preparation of the 5-acetoacetylamino-2-methylthiobenzothiazol one proceeds with the following quantities:

70 parts of the base in
500 parts of chlorobenzene are filtered and poured in the hot during 1 hour into:

300 parts of boiling chlorobenzene
78 parts of acetyl acetic ether

The operation lasts 3 hours during which one distills 600 parts of chlorobenzene. One extracts with 1,000 parts of soda at 4%o, dilutes to 2,000 parts with icy water and precipitates with diluted acetic acid. The acetoacetylated derivative precipitates in an oily condition and then crystallizes (M. P.=50° C.).

Example 25

For the preparation of the derivatives of the 6 - methoxy - 5 - aminobenzothiazol the starting product is the 1-chloro-2-nitro-4-acetylamino-5-methoxybenzene,

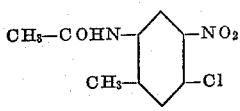

with a melting point of 178–180° C. which is prepared in the following manner:

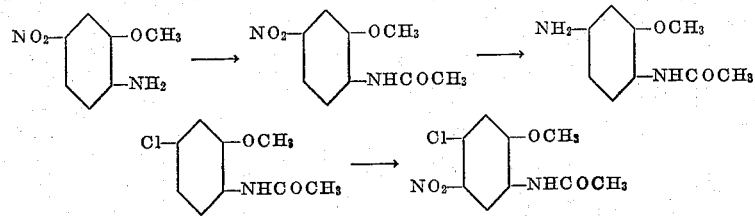

One prepares as in the preceding examples the 2 - 2' - dinitro - 4 - 4' - diacetylamino - 5 - 5'- dimethoxy - diphenyldisulphide with a melting point of about 305° C.;

The 5 - methoxy - 4 - acetylamino - 2 - aminothiophenol;

The 6 - methoxy - 5 - amino - 2 - methylbenzothiazol with a melting point of 114° C.;

The 6 - methoxy - 5 - acetoacetylamino - 2 - methylbenzothiazol with a melting point of 80–81° C.;

The 6 - methoxy - 5 - acetylamino - 2 - hydroxybenzothiazol;

The 2 - 6 - dimethoxy - 5 - acetylaminobenzothiazol with a melting point of 203–204° C.;

The 2 - 6 - dimethoxy - 5 - aminobenzothiazol with a melting point of 138° C.;

The 2 - 6 - dimethoxy - 5 - acetoacetylaminobenzothiazol which melts at 146° C. and then solidifies again and melts again at 159° C.;

The 6 - methoxy - 5 - acetylamino - 2 - ethoxybenzothiazol with a melting point of 164° C.;

The 6 - methoxy-5-amino-2-ethoxybenzothiazol with a melting point of 83–84° C.;

The 6 - methoxy - 5 - acetoacetylamino - 2 - ethoxybenzothiazol with a melting point of 123–124° C.;

The 6 - methoxy - 5 - acetylamino - 2 - mercaptobenzothiazol;

The 6 - methoxy - 5 - acetylamino - 2 - methylthiobenzothiazol with a melting point of 191–192° C.;

The 6 - methoxy - 5 - amino - 2 - methylthiobenzothiazol with a melting point of 106–107° C.;

The 6 - methoxy - 5 - acetoacetylamino - 2 - methylthiobenzothiazol with a melting point of 152–155° C.

Example 26

One obtains in the same manner from the 5-chloro-4-nitro-2-acetylaminotoluene:

The 2 - 2' - dinitro - 4 - 4' - diacetylamino - 5 - 5'- dimethyl - diphenyl - disulphide;

The 5 - methyl - 4 - acetylamino - 2 - aminothiophenol;

The 2 - 6 - dimethyl - 5 - aminobenzothiazol;

The 2 - 6 - dimethyl - 5 - acetoacetylamino-benzothiazol with a melting point of 152° C.;

The 6 - methyl - 5 - acetylamino - 2 - hydroxybenzothiazol;

The 6 - methyl - 5 - acetylamino - 2 - methoxybenzothiazol;

The 6 - methyl - 5 - amino - 2 - methoxybenzothiazol with a melting point of 166° C.;

The 6 - methyl - 5 - acetoacetylamino - 2 - methoxybenzothiazol with a melting point of 148° C.;

The 6 - methyl - 5 - acetylamino - 2 - mercaptobenzothiazol;

The 6 - methyl - 5 - acetylamino - 2 - methylthiobenzothiazol with a melting point of 203–204° C.;

The 6 - methyl - 5 - amino - 2 - methylthiobenzothiazol with a melting point of 143–144° C.;

The 6 - methyl - 5 - acetoacetylamino - 2 - methyl-thiobenzothiazol with a melting point of 157–158° C.

Example 27

3 parts of 6-methoxy-5-acetoacetylamino-2-methylbenzothiazol are mixed intimately with:

16.8 parts of a diazoamino combination of the 5-nitro-o-toluidin with the hydroxyethylanthranilic sulphonic acid:

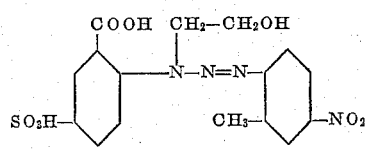

20 parts of this mixture are pasted in:

25 parts of Turkish red oil,
12 parts of caustic soda of 38° Bé. and
75 parts of tepid water The resulting solution is added while stirring to 250 parts of a neutral starch-gum tragacanth thickening agent and one brings to 500 parts through addition of water or of thickening agent, at will.

After printing and drying one steams during 5 minutes in an acetic vapour, rinses, soaps at ebullition point, rinses and dries. One obtains an orange yellow of good properties of fastness.

Example 28

10 parts of 6-methyl-5-acetoacetylamino-2-methylthiobenzothiazol are mixed intimately with 10.2 parts of a diazoamino combination of 4-chloro-O-toluidin with sarcosin (1 mol.=307 grams), and 4.8 parts of anhydrous sodium sulphate.

20 parts of this mixture are pasted in:

25 parts of Turkish red oil.
15 parts of caustic soda of 38° Bé. and
75 parts of tepid water.

The resulting solution is added while stirring to 250 parts of starch-gum tragacanth and one brings to 500 parts through addition of thickening agent or water.

After printing one dries and steams during 5 minutes in an acetic vapour. One obtains a yellow of good properties of fastness.

More generally, by using the various products of the general formula:

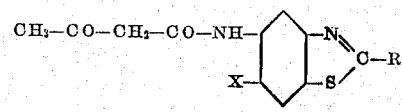

where R represents an alkyl, alkoxy or alkylthio group and X an atom H or an alkyl or alkoxy group, mixed with the diazoamino combinations of various solid bases such as:

4.Cl.o toluidin on sarcosin
5.Cl.o toluidin on sarcosin
p.Cl.o.aminoanisol on sarcosin
5-nitro-o-toluidin on hydroxyethylanthranilic-5-sulphonic acid (COOH=1)

or still with nitrosamines or other bases such as 2-5-dichloranilin, the m.chloranilin, o. nitrotoluidin and the like one obtains a whole scale of colours from very greenish yellow to orange showing a series of good properties of fastnesses.

What we claim is:

A textile printing composition comprising a diazoamino derivative and a member of the group consisting of compounds of the general formulae:

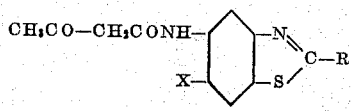

and

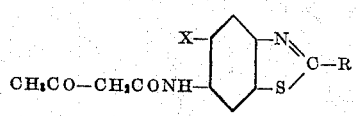

in which R represents a member of the group consisting of alkoxy and alkyl thio radicals and X represents a member of the group consisting of the alkyl and alkoxy radicals.

PIERRE PETITCOLAS.
ROBERT FRÉDÉRIC MICHEL SUREAU.

REFERENCES CITED

The following references are of record in the file of this patent:

UNITED STATES PATENTS

| Number | Name | Date |
|---|---|---|
| 1,560,514 | Zitscher | Aug. 26, 1924 |
| 1,968,879 | Dahlen | Aug. 7, 1934 |
| 2,015,161 | Schweitzer et al. | Sept. 24, 1935 |
| 2,093,214 | Schroder et al. | Sept. 14, 1937 |
| 2,112,764 | Dahlen | Mar. 29, 1938 |
| 2,195,011 | Petitcolas et al. | Mar. 26, 1940 |
| 2,257,190 | Riedmair | Sept. 30, 1941 |

FOREIGN PATENTS

| Number | Country | Date |
|---|---|---|
| 762,528 | France | Jan. 27, 1934 |

OTHER REFERENCES

Hackh's Chemical Dictionary, 3rd ed., 1944.